March 15, 1932.   G. D. ILLIG ET AL   1,849,145
VENDING OR SERVING MACHINE
Filed Nov. 5, 1929   5 Sheets-Sheet 1
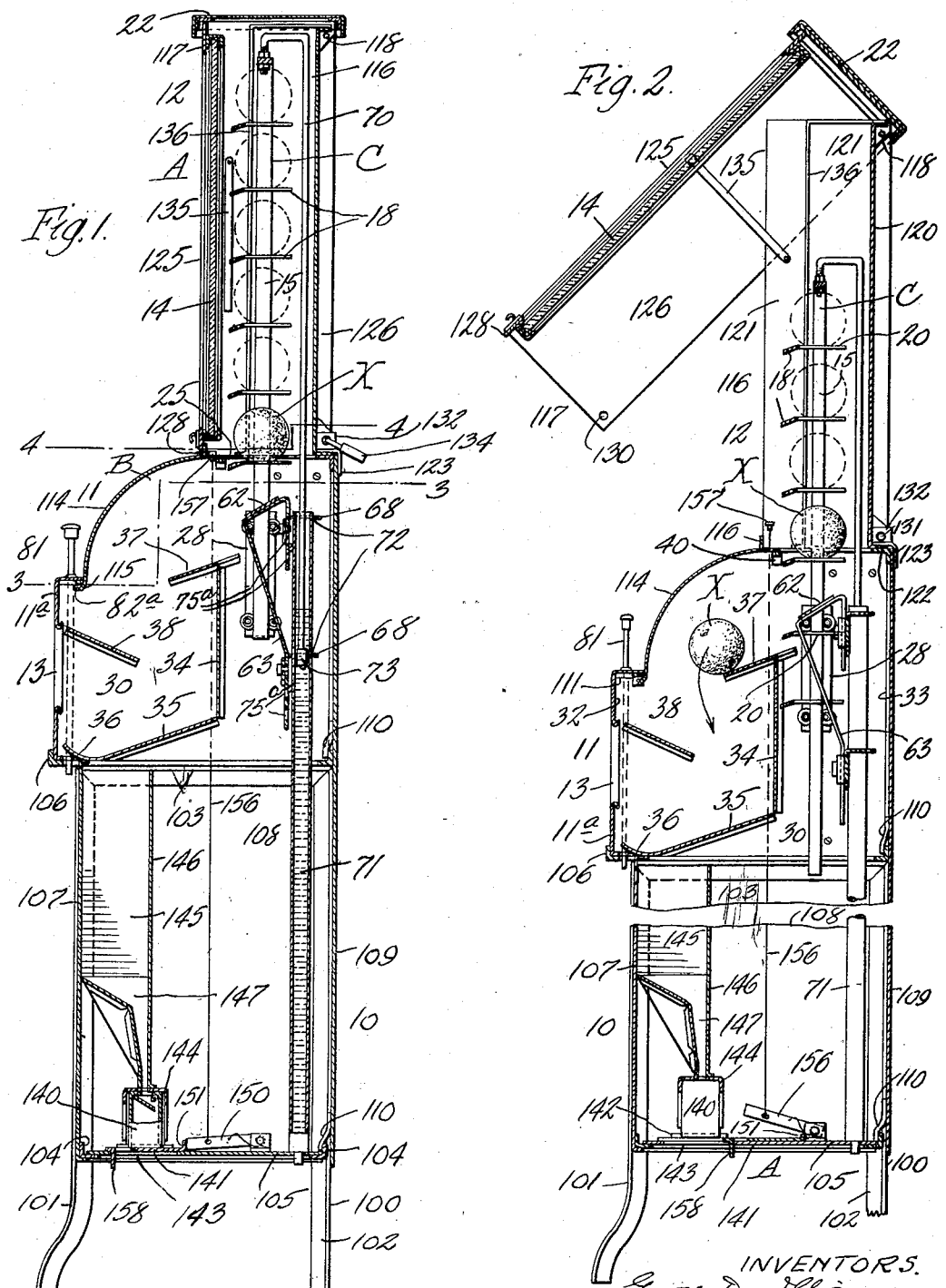

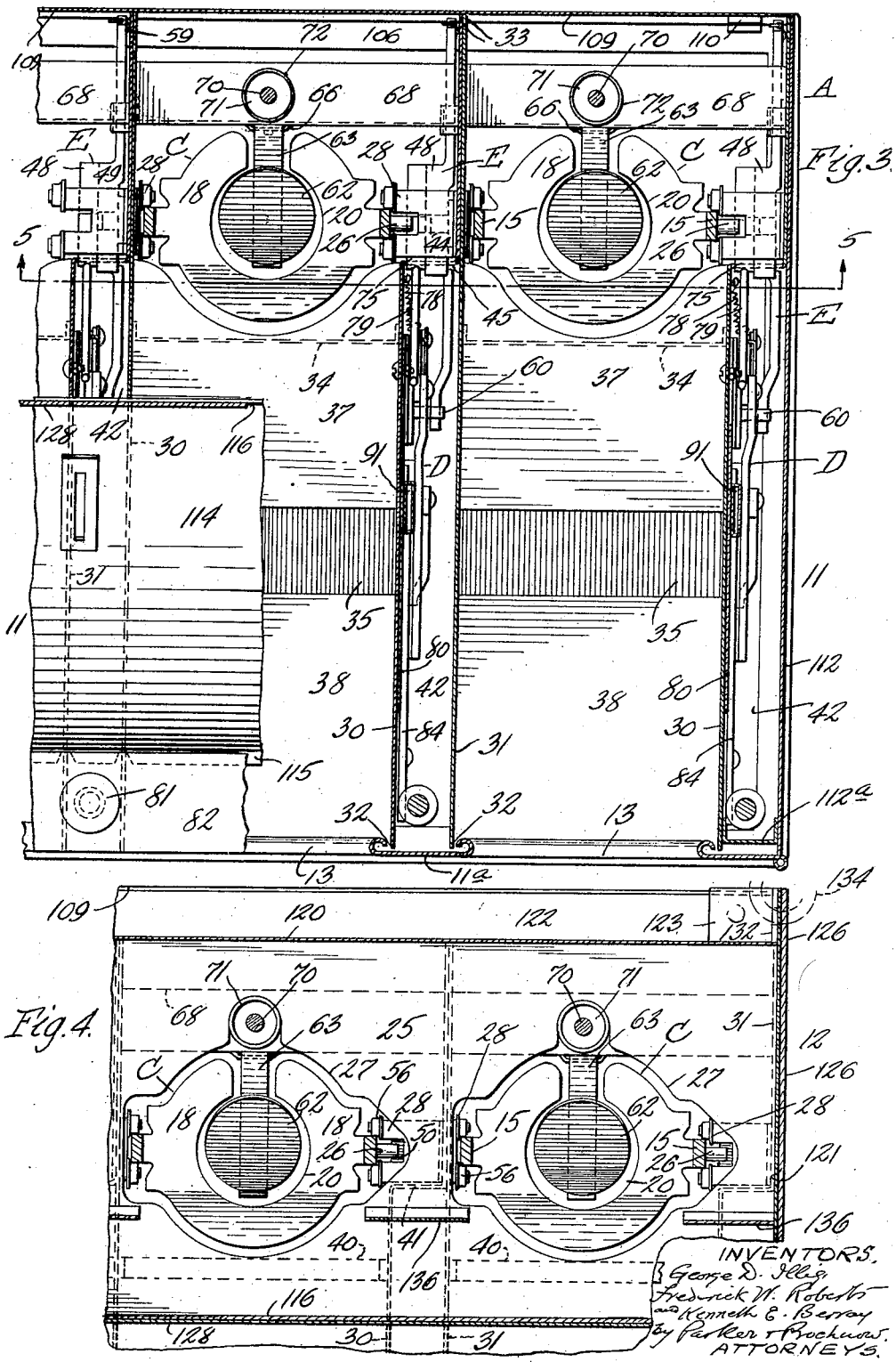

March 15, 1932. G. D. ILLIG ET AL 1,849,145
VENDING OR SERVING MACHINE
Filed Nov. 5, 1929 5 Sheets-Sheet 3
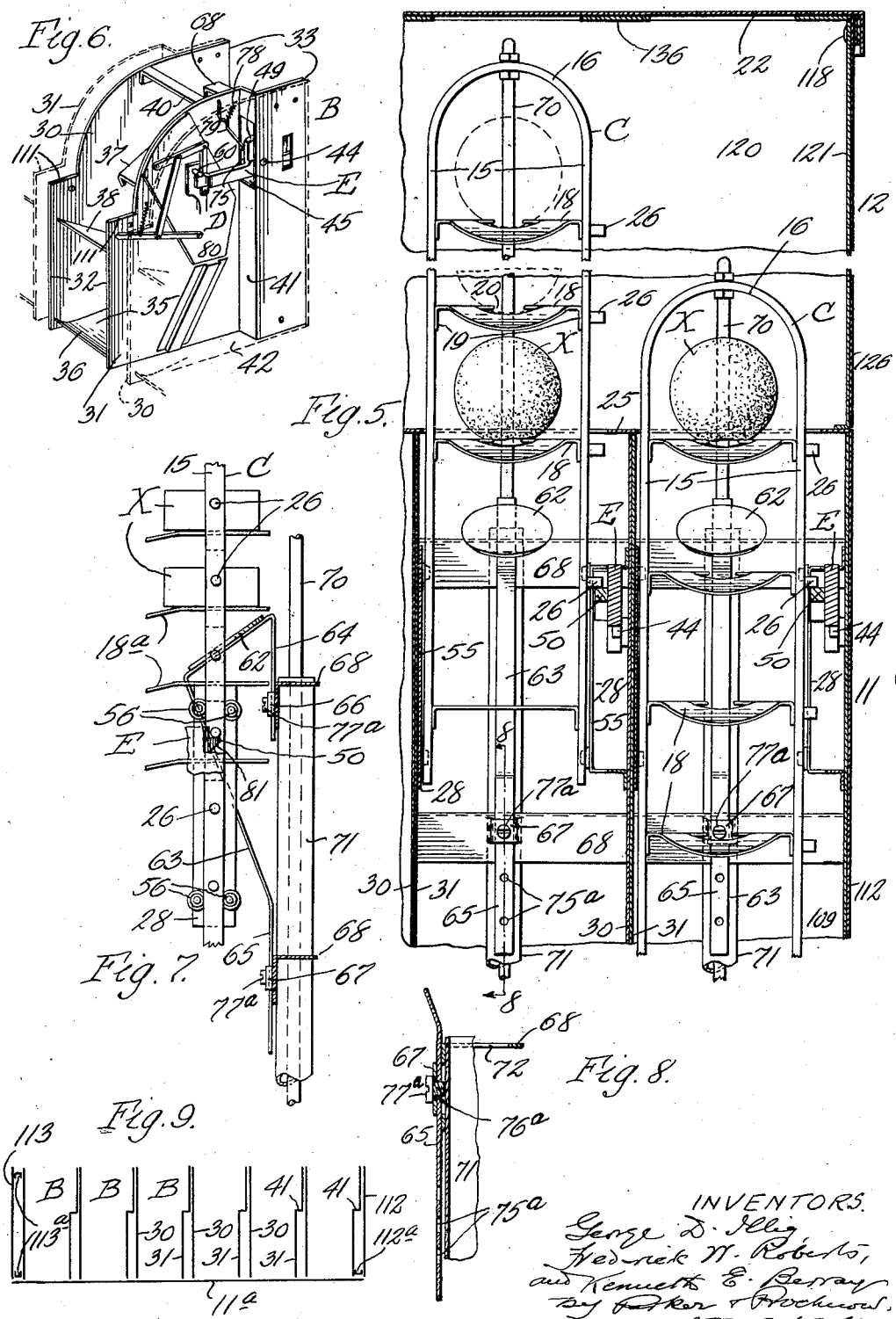

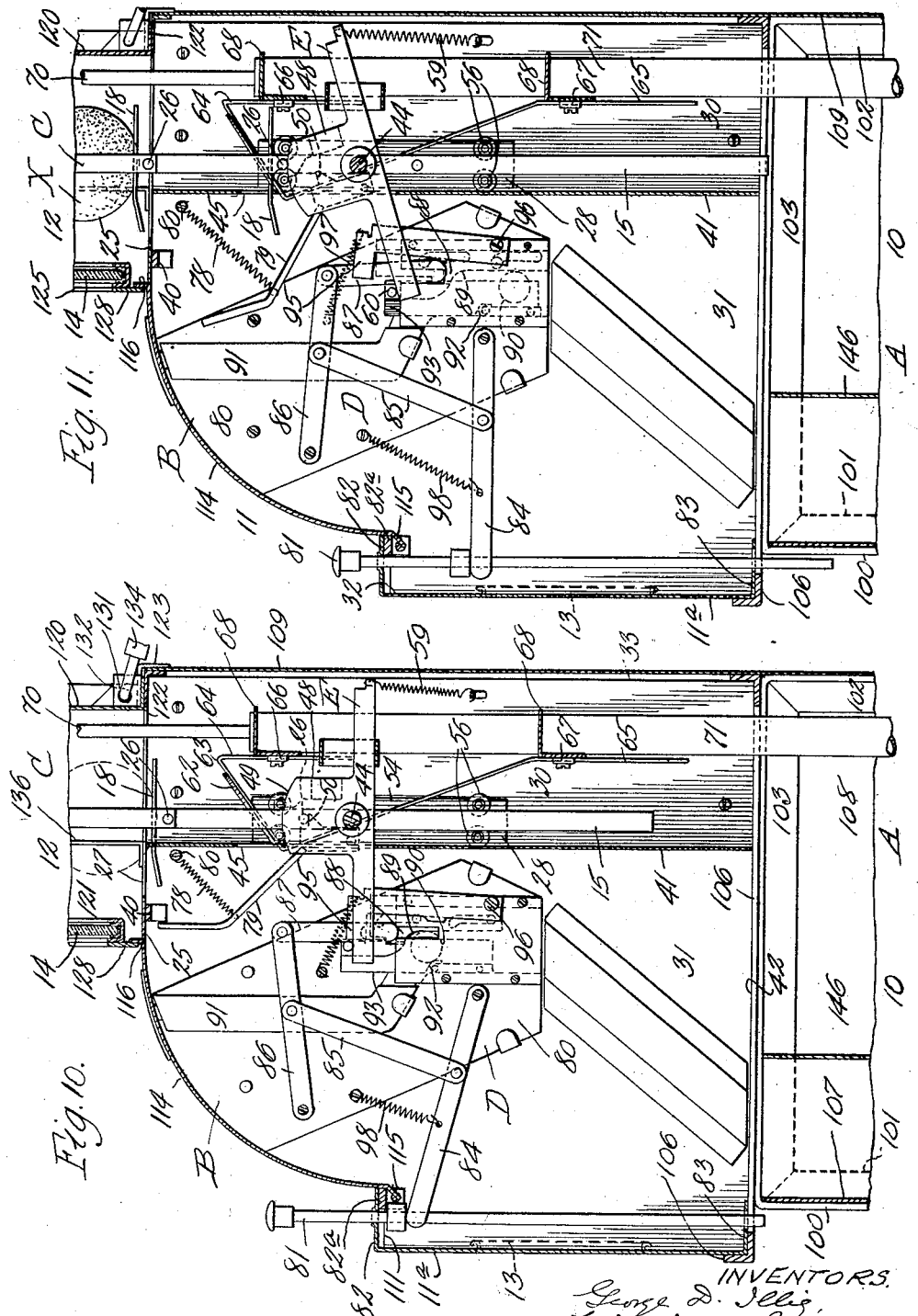

March 15, 1932.   G. D. ILLIG ET AL   1,849,145
VENDING OR SERVING MACHINE
Filed Nov. 5, 1929   5 Sheets-Sheet 5

INVENTORS.
George D. Illig,
Fredrick W. Roberts,
and Kenneth E. Berray,
By Parker & Prochnow,
ATTORNEYS.

Patented Mar. 15, 1932

1,849,145

UNITED STATES PATENT OFFICE

GEORGE D. ILLIG, FREDRICK W. ROBERTS, AND KENNETH E. BERRAY, OF LOCKPORT, NEW YORK, ASSIGNORS TO F. W. ROBERTS MANUFACTURING CO., INC., OF LOCKPORT, NEW YORK

VENDING OR SERVING MACHINE

Application filed November 5, 1929. Serial No. 404,951.

This invention relates to improvements in vending or serving machines or apparatus.

Some objects of the invention are to provide an improved vending or serving machine or apparatus particularly adapted for dispensing relatively perishable articles or commodities such as fruits and the like; also to provide an apparatus of this sort in which said articles or commodities are individually supported; also to provide a vending apparatus in which the articles can be readily seen and selected while being prevented from unauthorized removal from the apparatus; also to provide an apparatus of this sort having supports for the articles which are readily accessible for servicing the apparatus; also to provide a vending apparatus in which the articles may be so arranged that a purchaser may see and select a particular article and will be assured that the selected article will be delivered; and also to construct an apparatus of this sort in which articles or commodities are supported and protected and from which said articles can be delivered without injury.

Other objects are to construct a vending or servicing apparatus having a vending unit of improved and compact construction for supporting and delivering articles, and which is of relatively simple construction such as will not readily get out of order in use; also to construct a vending unit provided with a movable carrier for supporting a plurality of articles in spaced relation so that the articles will be delivered therefrom one at a time; also to provide a unit of this sort having simple and positive means for ejecting the articles successively from said support; also to provide a unit of this sort having a support for a plurality of articles and which is provided with actuating means causing the articles to be successively discharged from the support; also to provide a vending unit including a support for the article controlling member for actuating the support, and mechanism carried on said unit for actuating said controlling member; also to provide a vending or serving unit of this character which is constructed so that a number of such units may be assembled side by side and whereby any one of said units may be removed from the series without displacing the remaining units. Also to provide a cabinet or enclosure for supporting a series of such units and which is constructed to permit the actuation of an article support on any of said units for dispensing articles therefrom upon proper actuation of said controlling member and which nevertheless prevents unauthorized actuation or removal of the articles therefrom; also to construct a cabinet or enclosure for one or more units of this kind which is constructed to permit ready access to said unit or units by an authorized person for service, repair or removal of one or more of said units; also to construct an improved and attractive cabinet for enclosing a series of vending or serving units wherein the supports and the articles thereon will be visible through a window or the like structure while the various controlling and actuating means for said supports are concealed from view; also to construct a vending unit or apparatus provided with a movable support having a plurality of individually spaced rests each of which supports an article; also to provide a unit or apparatus of this sort with a relatively stationary ejector or discharge device which is disposed to engage successive articles by the movement of said article support relatively to said ejector; also to provide improved means for controlling the movements of the carrier so that the carrier will be actuated and arrested in accordance with the spacing of the individual rests thereon so that only one article at a time will be discharged therefrom; also to provide means for cushioning the movements of said carrier so as to prevent jarring or injuring of the articles thereon, and also to prevent the articles from being displaced therefrom except by engagement of said articles by the ejector.

Other objects are to improve vending or serving apparatus in the other respects hereinafter set forth and claimed.

In the accompanying drawings:

Fig. 1 is a transverse vertical section illustrating an embodiment of our improved vending or serving apparatus.

Fig. 2 is a similar view with some of the parts in different positions.

Fig. 3 is a fragmentary horizontal section thereof, on an enlarged scale, approximately on the line 3—3, Fig. 1.

Fig. 4 is a similar view thereof on the line 4—4, Fig. 1.

Fig. 5 is a fragmentary vertical section of the vending apparatus approximately on the line 5—5, Fig. 3, on a reduced scale.

Fig. 6 is a perspective view of one of the vending units removed from the apparatus, a portion only of the coin-controlled mechanism thereof being shown.

Fig. 7 is a fragmentary transverse vertical section of a modified form of article carrier.

Fig. 8 is a fragmentary transverse section of the ejector adjusting means on the line 8—8, Fig. 5.

Fig. 9 is a diagrammatic plan view showing a group of units in assembled relation to a pair of side walls and a front wall of the casing.

Figs. 10 and 11 are transverse vertical sections showing a coin mechanism which may be used for actuating the controlling member for the article carrier, said mechanism being in a normal inoperative position and an intermediate position respectively.

Figure 12:
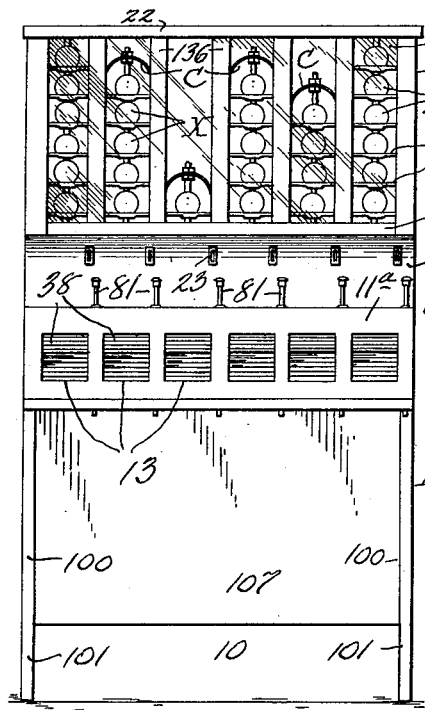
Fig. 12 is a front elevation of the vending and serving apparatus on a reduced scale.

In the embodiment of the invention illustrated in the drawings, our improved vending or serving machine or apparatus includes a cabinet or case A having a lower chamber or portion 10, an intermediate portion 11 disposed above the chamber 10 and a display section 12 which extends upwardly from the intermediate section 11.

Within the intermediate section 11 is disposed a plurality of separate vending units or structures B arranged side by side and detachably connected and from each of which a movable article carrier or member C extends upwardly into the display compartment 12.

The article carriers C are each constructed to support a plurality of articles X in spaced relation in a vertical row or series, each on an individual rest, and the display section 12 is provided with a front window or other transparent member 14 through which the articles on the article carriers are visible to enable a purchaser to make a selection.

Each of the units B includes a controller member E upon which the corresponding article carrier C rests, said controller being operable to cause an article on the carrier C to be discharged therefrom to a position adjacent an opening 13 in the front wall 11a of the section 11, where it is accessible to the purchaser. An opening 13 is provided for each unit B and its companion carrier C.

Each article carrier or support C includes an upright frame or member formed of a bar or strip of metal bent to inverted U-shape, thus providing opposite parallel spaced legs or side pieces 15 connected at their upper ends by a cross member 16. A plurality of rests 18 are arranged in spaced relation between and are connected to said legs 15. Each rest 18 is formed of a plate or sheet of metal having opposite depending lugs or parts 19 which are welded or otherwise rigidly secured to the legs 15. The rests or plates 18 are each formed with a central opening or aperture 20 terminating at the rear edge of the plate, thus providing an article support somewhat in the form of a horse shoe, and having spaced parts on which the article rests extending across the space between said parts. The opening 20 is for a purpose to be later described.

In their normal position, the article supports or carriers C are disposed with their tops or cross members 16 adjacent the horizontal top wall or plate 22 of the upper section 12, and in this position the lowest rest 18 is disposed adjacent a horizontal wall or plate 25 separating the intermediate section 11 from the display section 12, so that the article on this rest is at the bottom of the series adjacent the lower edge of the window or front 14 of the casing. In this position of the parts all of the articles are visible to a purchaser.

Each carrier C is provided, preferably adjacent each of the rests 18 with a supporting stud or projection 26. These studs are spaced to correspond with the spacing of the rests 18 and the number of studs 26 on each carrier is one in excess of the number of rests on the carrier. The additional stud 26 is arranged on the carrier below the lowest rest 18 thereof.

The carriers C extend downwardly through openings 27 in said plate 25 into operative relation with the corresponding units B, each of the latter being provided with suitable guides 28 in which a carrier engages so as to be supported for vertical up and down movements, while being prevented from lateral displacement.

Each of the aforementioned units B, (see Fig. 6) includes a pair of upright, substantially parallel spaced walls 30 and 31 extending transversely of the casing A. These plates are connected intermediate their front and rear edges 32 and 33 by an upright partition or plate 34 provided with flanges which are welded or otherwise secured to the adjacent faces of said plates. The bottom edge of the plate 34 terminates adjacent the rear edge of a downwardly and forwardly inclined bottom plate 35, the front portion of which is curved upwardly, as shown at 36 in Figs. 1 and 2. An inclined guide plate or baffle 37 is secured to and extends between the plates 30 and 31 at the upper edge of the partition 34, and a second reversely inclined baffle 38 is disposed forwardly of and below the front edge of the baffle 37 approximately midway between the latter and the curved front portion 36 of the bottom plate 35. A cross brace or bar 40 connects said plates 30 and 31 at their upper edges.

As shown in Fig. 3, the side plate 31 of each unit B is offset between its front and rear edges 32 and 33 to provide a narrow upright wall 41 extending crosswise of and connecting the front and rear portions of said wall.

If the units B are arranged side by side, as shown in Fig. 3, with the wall 30 of one unit abutting against the rear parallel portion of the wall 31 of another unit, an upright, narrow transverse recess or pocket 42 will be formed between said units. Suitable mechanism is preferably arranged in each of the recesses 42, a coin actuating mechanism D being employed in the construction shown. The coin actuating mechanism D of each unit is arranged in operative relation to the movable controlling member E, for operatively supporting and controlling the movements of the article carrier C of the corresponding unit B as stated, so that by operating the mechanism D, the controlling member E may be caused to actuate the carrier step by step in a downward direction to deliver the articles thereon one after another.

The controlling member E of each unit is in the form of a transverse horizontal lever mounted on a pivot 44 and extends transversely through an aperture 45 in the offset upright portion 41 of the wall 31 of the unit. The pivot 44 is preferably secured on and extends from the rear portion of said wall adjacent said opening 45.

The controlling member or lever E (see Figs. 13–15) is provided intermediate of its ends with an upwardly extending projection 48 terminating in a top face or edge 49 which is preferably curved concentrically with the pivot 44 and is disposed in a vertical plane passing transversely through the studs 26 of the corresponding carrier C. The projection 48 is further provided with a shoulder or stop 50, which is disposed in alinement with and below said series of studs 26, one or the other of which engages and rests on said stop so as to support the carrier by its own weight, or the combined weight of the carrier and the articles thereon, as the case may be. When said carrier is in its uppermost position, as previously explained, the lowermost stud 26 thereof engages or rests on said shoulder 50.

Figure 13:
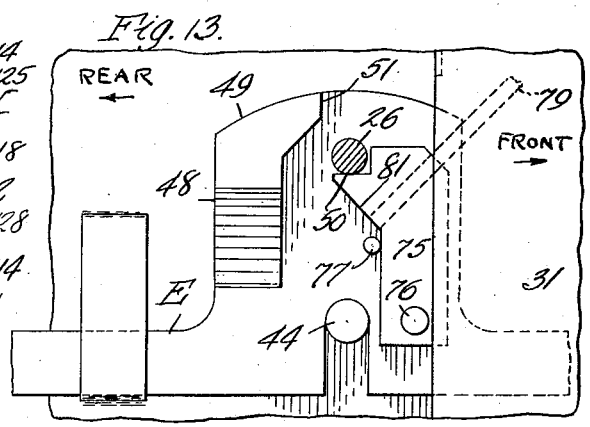
Figs. 13 and 14 are fragmentary sectional elevations, on an enlarged scale, of the article carrier controlling member in two different positions.

The front edge 51 of the top face 49 terminates rearwardly at one side of the vertical row of studs 26, as shown in Fig. 13, while the rear edge of the shoulder or stop 50 projects rearwardly beneath the stud a distance sufficient only to permit the stud to remain on the stop.

As shown in Figs. 3, 4, 10 and 11, each carrier guide 28 comprises an upright plate 55, secured to the adjacent side wall 30 or 31 and is provided with upper and lower pairs of spaced, flanged guide rollers 56 between which the carrier legs 15 extend with their side edges in contact with the hubs of said rollers, and their outer faces engaging the flanges thereof. In this way the carriers can be guided in their up and down movements and are prevented from lateral displacement.

The proportions of the parts 49 and 50 of each controlling member E is such that if the projection 48 thereof is swung forwardly about the pivot 44, the stop 50 will be moved from beneath the carrier stud 26 resting thereon, thus permitting the carrier to descend.

The rear end of each controller or lever E is connected to a tension spring 59 which acts to hold said controller in a normal position with its front end bearing upwardly against a stop pin or abutment 60. In the construction shown this stop pin forms part of the actuating mechanism D, and said stud is movable downwardly to swing the lever E in a direction to release its carrier C, and is then movable upwardly to its original position to permit the controller E to return to normal position under the influence of said spring 59, after the carrier C has descended one step.

In the downward movement of an article carrier C, that article rest 18 thereof which occupied a position at the bottom of the display compartment, passes through the adjacent opening 27 of the plate 25 into the corresponding unit B. Means are provided, which during this movement, engages the article on this particular rest to discharge or direct it therefrom and cause it to be delivered at the opening 13 for that unit, the article dropping successively upon deflectors 37 and 38, and then upon the inclined bottom plate 35, coming to rest at the curved front portion 36 thereof, where it may be removed through said aperture 13.

In the construction shown for this purpose, a downwardly and forwardly inclined cam or member 62 is stationarily supported in the path of the descending article X, being positioned below the plate 25 and above the plane into which the successive article rests move after passing through the hole 27. The cam 62 is formed on or secured to a vertically disposed bent bar or bracket 63, the upper and lower legs or ends 64 and 65 respectively of which extend downwardly through clips or sockets 66 and 67. The clips are respectively formed on the vertical flanges of a pair of horizontal angle bars 68 disposed one above the other and having their ends secured to the opposite faces of the side plates 30 and 31 of a unit B. The cam 62 of each unit is so shaped and disposed that the openings or recesses 20 of the article rests permit the rests to straddle and pass downwardly over the cams, while the articles, which extend over the openings, are intercepted and engaged by the cams, and since the cams are inclined, the articles are moved forwardly thereby so that they are discharged from or fall off the rests. In their fall the articles descend to the bottom plates 35 and pass to the openings 13, as explained.

Figure 14:
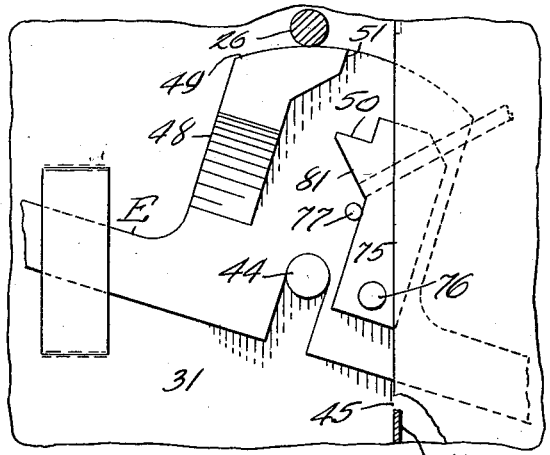
Figure 16:
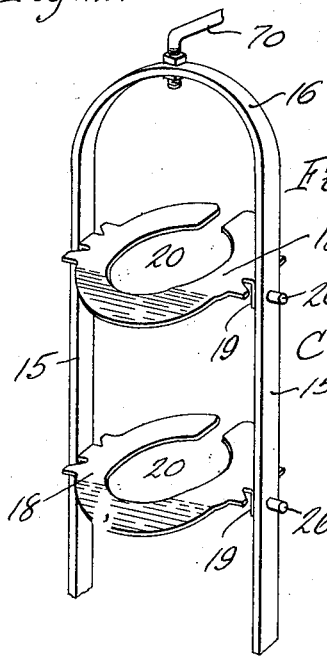
Fig. 16 is a perspective view of the upper end of one of the article carriers.
Figure 15:
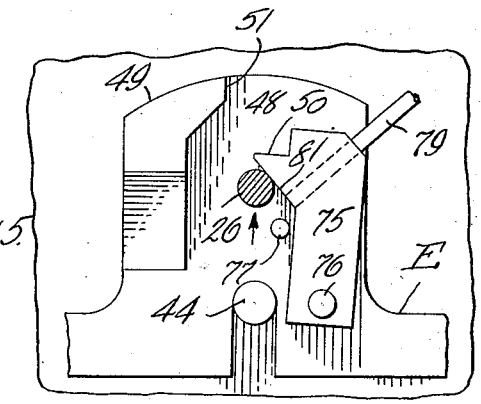
Fig. 15 is a similar view thereof showing a pivoted dog thereon in a deflected position for permitting the article carrier to return to its upper position.

From the foregoing it will be seen that each time a controller or lever E is actuated a full stroke, or is moved from the position shown in Figs. 10 and 13 to that shown in Figs. 11 and 14, the associated article carrier C is lowered a distance equal to that from one rest 18 to another, by the release or disengagement of one of the studs 26 from the stop shoulder 50 and the engagement of the next stud 26 therewith, an article being engaged each time by the cam 62 and discharged from the carrier.

In order to cushion or afford an easy, smooth descent of the carriers C, and prevent sudden jarring of the carriers when released from or when engaging the control levers E, such as might displace the articles thereon, each carrier is provided with a rod 70 which extends rearwardly from its top cross piece 16 and thence downwardly into a fixed vertical cylinder or tube 71 which extends upwardly from the bottom of the lower section 10 into the intermediate section 11 of the casing A. The cylinder may be supported by extending its upper end into holes 72 in the horizontal flanges of the cross bars 68. The cylinder is filled with oil or other liquid, and the lower end of the rod 70 is provided with a piston 73 working in said cylinder. A dash pot construction is thus provided to control the speed of descent of each carrier C, and preferably the cylinder 71 is left open at the top to permit the piston to be removed with the carrier when desired.

When automatic or coin controlled means, such as the mechanism D is used for actuating the control member E of each carrier C, the releasing movement of said member in operating the carrier, and the return movement of the member by the spring 59 to arrest the carrier is relatively quick, and the member E will normally be returned to its carrier supporting position before the next stud 26 reaches said member. Consequently there will be no obstruction to the direct descent of this stud to its position upon the stop 50, since the descent of the carrier is relatively slow as controlled by the dash pot provided for that purpose. However, owing to the relative position of the face 49 of the controlling member to said stop 50, this face is moved forwardly into the path of the descending studs 26 each time the member is actuated, so that should the dash pot fail to act, or should the coin controlled or other automatic mechanism be omitted and the controlling member be actuated directly by hand, then the face 49 will be in position to intercept the descending stud 26. In this way the carrier is supported in an intermediate position by the projection or face 49 until the lever E is swung to shift the end 51 of the face from beneath the stud. However, this does not occur until the stop shoulder 50 has been moved into position to arrest the same stud 26, thus preventing the carrier from overrunning and delivering two or more articles at one time.

It will be understood from the foregoing description that a person desiring to purchase or be served with an article from the apparatus can make a selection therefrom by choosing the lowermost article X of any series, as seen through the window 14, and then by causing the carrier C upon which the selected article is supported to be actuated through the corresponding controller E, this article will be delivered through the appropriate opening 13.

As the articles are delivered from the carriers C, these carriers will move downwardly step by step, so that the lowermost article on each carrier is always opposite the bottom of the window so that the purchaser may be assured that he will get the particular article he desires.

After all of the articles have been dispensed or served from a carrier, all of the rests 18 of this carrier will have disappeared from view within the intermediate section 11 of the casing.

As thus far described, downward actuation and movement only of the carriers C has been referred to, and the upward movement or return of these members will now be explained. Since the stop shoulders 50 are disposed in the path of the studs 26 of the carriers, the said stop shoulders 50 are preferably movably arranged with relation to the controllers E. For this purpose, in the construction shown, each shoulder 50 is formed on a separate dog or part 75, which is pivoted on the controller at 76 and is held in operative position against a fixed stud or pin 77 by a tension spring 78, one end of which is secured to an arm or extension 79 on said dog, the other end of the spring being secured to a fixed pin or the like 80. The dog is provided beneath the shoulder 50 with an inclined face or cam 81 terminating at the free end of the shoulder. By this construction, the carriers C can be moved to their upper position so as to be provided with more articles by a direct upward pull which causes the studs 26 of the carriers to engage the cams 81 of the dogs 75, thereby deflecting these dogs and permitting the studs to pass. Each time a stud 26 passes over the ends of the connected ends of a cam 81 and stop shoulder 50, the dog will snap back into place under the influence of its spring 78. The controllers remain stationary during this operation.

The provision of the extension 79 on each dog 75 enables the dogs to be actuated for lowering the carriers C, when the casing A is opened, as will be explained, thus permitting the apparatus to be tested without operating the control members E.

Obviously the article rests of the article carriers C may be spaced apart more or less in accordance with the size of the articles to be vended or served. For example, the rests 18a shown in Fig. 8 are more closely spaced than the rests 18 of the other figures, and in order to insure that the article discharging cams 62 will be correctly positioned to co-operate with and properly deliver the articles from rests spaced different distance apart, said cams or ejectors 62 are made vertically adjustable. In the construction shown for this purpose the legs or ends 64 and 65 of the cam supporting brackets 63 are provided with a series of vertically spaced holes 75a, one or the other of which can be placed into registration with a hole 76a in the corresponding clip 66 and 67, as shown in Fig. 8. A screw or other fastening device 77a passing through the registering holes secures the parts in their adjusted positions.

It should be here understood that while a coin controlled actuating mechanism is shown in the drawings for operating the control member E, any other suitable means can be provided for preventing unauthorized actuation of the control member when the articles are to be vended from the apparatus, or if the articles are merely to be dispensed or served therefrom, any suitable equivalent of the stop 60 can be provided for holding the controller in normal position and which will permit the controller to be actuated by hand when desired.

Since the coin controlled actuating mechanism D is not to be claimed in the present invention, the same will only be briefly described. Each coin-controlled mechanism D, (see Figs. 10 and 11) comprises a plate 80 stationarily mounted in the recess 42 between two of the units B, on the adjacent side plate 31. A vertical push rod or plunger 81 is arranged in the forward part of the intermediate section 11 of the casing with its upper end extending outwardly through a rearwardly extending horizontal top flange 82 of the front wall 11a of the section 11. The lower end of this plunger is guided in a hole in a bottom flange 83 of said wall 11a. A collar on the push rod 81 is disposed so as to engage the forward end of a lever 84 pivoted at its rear end on the plate 80, said lever being connected by links 85 and 86 to a vertical link 87 terminating in a vertically slidable plate 88. This plate 88 is undercut to form a stop or shoulder 89 which is adapted to engage a coin or token 90, the latter being guided into position beneath said shoulder after having been deposited in a coin shute 91. When the coin moves to the position described, it engages a second stop 92 disposed opposite the shoulder 89 and formed on a movable plate 93. The coin comes to rest supported by and acting as an interponent between said stops 89 and 92. The plate 93 carries the aforementioned stud or stop 60 which engages the controller E. By depressing the rod or plunger 81, the plate 88 through the connections described will be moved downwardly and through the intervention of the coin, the plate 93 will also move downwardly, causing the stop pin 60 to swing the controller E about its pivot 44. When no coin is present the reciprocation of the plunger 81, while causing the downward movement of the stop 89, will not affect the plate 93, consequently the stud 60 will not be actuated.

Before the stud 60 reaches the downward limit of its stroke a detent 95 pivoted at 96 is moved by a coil spring 97 into a position in which it will engage over the stud 60 so as to prevent the return of the plate 88. This also prevents the movement of a second coin into operative relation to the stops 89 and 92 until after the entire cycle of operations has been completed. At the completion of the downward stroke of the plates 88 and 93 however, the detent 95 is swung about its pivot to release the stud 60 so that the parts may be returned to their initial positions, as by a tension coil spring 98, the stud 60 and its plate 88 being of course, returned through the action of the spring 59 and controller E. Thus, each time a coin is inserted, and a plunger 81 is actuated the corresponding controller E will be actuated to cause the descent of the associated article carrier C one step, the latter being arrested after each operation by the engagement of the successive stops 26 with the shoulder 50 of the controller in the manner described.

The cabinet A enclosing the units B and the various instrumentalities associated therewith as described, can be of any suitable form, but preferably is constructed as follows: The lower section 10 of the cabinet includes a pair of opposite side frame members 100 formed of angle bars and each having front and rear legs 101 and 102 and a top cross bar 103. Extending between the frames 100 is a pair of cross braces or supports 104 of angle section, the opposite inwardly extending flanges of which support a bottom plate 105.

A horizontal frame 106 is secured to the top flanges of the cross bars 103. This frame is formed of angle bars having their horizontal flanges extending inwardly and their vertical flanges extending upwardly. The front of this frame 106 projects forwardly over the front of the section 10.

The front and the opposite sides of the section 10 are closed by a front plate 107 and side plates 108 secured to the frame, and the rear of this section as well as that of the intermediate section 11 is closed by a back plate 109. This plate is provided with offset downwardly extending lugs 110 which engage over the upstanding flanges of the rear cross bar 104 and the rear bar of the frame 106, as shown in Figs. 1 and 2.

To assemble the units B in the casing A they are arranged side by side and connected by screws or fastening devices and with the intermediate front plate 11a extending across the series and having its upper flange 82 extending over the intermediate shoulders or extensions 111 of the plates 30 and 31, being preferably secured to cross bars or braces 82a extending between and connected to the plates 30 and 31 of each unit B. The lower flange 83 of the front plate or wall engages beneath the front end of said units.

The series of units B is provided at the right hand end, as seen in Fig. 9, with a finishing plate 112 corresponding to one of the plates 30, a spacing member 112a being disposed in the space 42 between the front portion of this plate and the adjacent plate 31. A similar plate 113 is arranged at the opposite end of the group, being separated from the adjacent plate 30 by spacers 113a. The several units B, front plate 11a and finishing plates 112 and 113, being suitably but detachably secured, they are together placed in the frame 106, resting upon the inturned flanges thereof. In this arrangement the plates 112 and 113 form the side walls of the intermediate section 11. The section is completed by attaching the top plate 25 to the braces 40, and then securing a removable service plate or cover 114 over the upper front portion thereof. This service plate is curved to conform to and rest upon the correspondingly curved upper front edges of the plates 30 and 31 and of the side plates 112 and 113. The lower edge 115 of said plate is offset forwardly and engages beneath the braces 82a, its upper edge being extended upwardly to form a flange 116 against which a movable part of the top section 12 engages to detachably secure the plate 114 in position.

The upper or display section 12 is formed of a relatively stationary member 116 and a movable member 117 hinged thereon at 118 so as to swing relatively thereto to permit access to the interior of the display section for servicing the article supports.

In the construction shown the stationary member 116 comprises an upright back wall 120 and connecting forwardly extending parallel side walls 121. These walls 120 and 121 are suitably secured to the top of the intermediate section 11, the wall 120 preferably having a rearwardly extending lower edge 122 over which a pair of spaced forwardly extending brackets or parts 123 fixed to the top corners of the back wall 109 engage.

The movable member 117 comprises an upright front frame 125 in which the window or transparent member 14 is secured, and this frame 125 is secured at its side edges to a pair of rearwardly extending upright side walls or plates 126, which in the closed position of said member are disposed outwardly alongside the walls 121 of the member 116. The member 117 is completed by the top wall 22 beforementioned. The pivots or hinges 118 extend through the upper rear corners of the side plates 126 and through the corresponding portions of the stationary side walls 121. At its lower front edge the window frame is provided with a depending flange 128 which, when the member 117 is moved to a closed position engages against the outer or front face of the top flange 116 of the service plate 114 thus preventing the removal of this plate. The side walls 126 are each provided with a hole 130 at its lower rear corner, which when in closed position registers with a corresponding hole 131 formed in a lug 132 extending upwardly from the adjacent bracket 123 of the back wall 109. When these holes are in register the parts can be locked in closed position by padlocks 134, the hasp of which passes through the holes. Thus the upper section 12, the back plate 109 and the service plate 114 of the intermediate section are all locked by the one locking means.

When it is desired to service or inspect the interior of the apparatus the padlocks are unlocked to permit the movable member 117 to be swung upon its hinges 118 as shown in Fig. 2, in which position it may be supported by pivoted braces or arms 135 carried on the stationary side plates 121. The service plate 114 can now be lifted out by disengaging its bottom flange 115 beneath the brace 82a thus permitting access not only to the interior of the display section 12 but also to the units B in the intermediate section 11.

It will be seen that the described construction permits the removal of a unit B from the group of units, by first disengaging the confining plates and withdrawing the corresponding carrier C.

If desired, a plurality of shields or narrow vertical plates 136 may be arranged in the display section 12 in front of the carrier legs 15, so as to conceal these parts and improve the appearance of the apparatus.

As shown in Figs. 1 and 2 a coin receiving box or container 140 is mounted in the lower section 10 of the casing preferably upon a movable slide 141 arranged to move rearwardly in guides 142 on the bottom wall 105 directly over an opening 143 in said wall. The box 140 extends upwardly into a stationary frame of retaining member 144 which is provided with a slot registering with the coin receiving slot in the top of the coin box.

Suitable means are provided for directing all of the coins or tokens from the several coin mechanisms of the units B into the box 140, such as a pair of oppositely inclined plates 145 which extend crosswise between the front wall 108 and a vertical parallel partition 146. The lower edges of the plates 145 terminate in a hopper 147, the lower end of which registers with the aforementioned coin receiving slots.

The slide 141 is normally held against rearward movement by a spring pressed latch 150 pivoted on the bottom wall 105 which engages an upturned flange 151 of said plate 141. The latch 150 is connected by a cable or the like 156 to an operating button or knob 157 which normally rests upon the top plate 25 of the intermediate section, and which may be raised to release the latch 150 through the cable 156 when the movable member 117 is opened. When the latch is raised the plate 141 can be pushed rearwardly by means of a depending flange 158 thereon, thus uncovering the opening 142 in the bottom wall 105 and affording access to the box 140. Any other suitable coin receiving or collecting means can be provided.

The apparatus described is relatively simple and compact, and the article carriers supported on the vending units and extending up into the display section afford novel and practical means of supporting the articles. Their construction also enables the cams or ejectors to positively engage the articles each time a carrier is actuated. The provision of the service plate, locked in place by the door or member on the display section affords ready access to the units in the intermediate section, by unlocking the door and then removing the service sheet. The units can be separately formed and a group can be readily assembled in the casing together with the carriers. The construction of the apparatus is such that a single unit can be removed without taking out the other units, and the carriers are readily removable from the corresponding units by merely raising them upwardly out of the intermediate section.

Claims:

1. In a vending machine, an article carrier having a plurality of fixed article rests disposed one above another in spaced relation, means for lowering the carrier step by step in accordance with the spacing of said rests, a stationary member disposed in the path of said articles and which engages an article to discharge it from its rest each time said carrier is lowered, a pair of fixed sockets, a pair of vertical legs on said stationary member each of which extends into one of said sockets and each having a vertical series of holes therein, and securing devices passing through lateral holes in said sockets and adapted to engage in one or another of the holes in each leg, whereby said stationary member is adjustable in a direction parallel with the line of travel of said carrier so that it may be positioned to co-operate with said carrier in accordance with the spacing of said article rests.

2. In a vending machine, an article carrier having a plurality of article rests disposed one above another in spaced relation, said carrier also having a plurality of parts thereon in vertical spaced relation in accordance with the spacing of said article rests, a controller having a stop upon which one of said parts rests for supporting said carrier, and said controller being movable relatively to said carrier to release said stop from said part and cause it to intercept another of said parts to lower the carrier step by step, and means engaging an article to discharge the same from its rest each time said carrier is lowered, said controller having a pivot on which said stop is mounted, means for yieldingly holding said controller stop in position to be engaged by and deflected out of the path of said parts on said carrier by an upward movement of the latter, whereby said carrier may be raised without moving said controller.

3. In a vending machine, a unitary, downwardly movable article carrier comprising a pair of spaced uprights, a plurality of article rests extending between and fixed to said uprights in spaced relation, and each having an opening over which the article thereon extends, means for lowering said carrier step by step, and a stationary member extending into alinement with the openings in said rests, and which as a rest passes downwardly thereby is engaged by and discharges an article from its rest each time said carrier is lowered.

4. In a vending machine having a casing, a unit removably mounted in said casing and comprising a pair of spaced, connected upright plates, a unitary, downwardly movable article carrier extending upwardly between said plates and comprising a pair of spaced legs, a plurality of article supports extending between and fixed to said legs in vertical spaced relation, open ended guides on said plates, a controller member pivoted on one of said plates and engageable with one of a series of spaced parts on said carrier to support the same and which is movable to disengage said part therefrom to permit said carrier to descend in said guides and to engage another of said parts to arrest said carrier, a stationary member on said unit which engages and discharges an article each time said carrier is lowered, and said carrier legs being detachably engaged in said guides, whereby, when said unit is removed from said casing, said carrier can be withdrawn from said guides out of said unit.

5. In a vending machine, a casing, a removable unit therein comprising a pair of spaced, connected upright plates, a unitary, downwardly movable article carrier extending upwardly between said plates and movable in guides thereon, and having a plurality of vertically spaced parts, one of said upright plates of said unit being offset towards the other to form a recess at the outside of said plate, actuating mechanism mounted on the outer side of said plate in said recess, and a controlling member mounted at the inner side of said plate and engaging one of the spaced parts of said carrier to support the latter, and said offset portion of said plate having an aperture through which said controlling member extends into operative engagement with said actuating mechanism, and said controlling member being operable to release said carrier part to allow said carrier to descend and intercept the next part thereon to arrest the carrier, whereby said carrier may be lowered step by step, and whereby, when said unit is removed from said casing, said actuating mechanism is readily accessible at the outside thereof.

6. In a vending machine, a casing having an intermediate section and a display section extending upwardly therefrom, a plurality of removable units arranged in said first section, a movable article carrier mounted on and extending upwardly from each unit into said display section for supporting the articles to be vended, means on each unit for operating the associated carrier for delivering the articles therefrom, said display section comprising a stationary wall member partly enclosing said carriers, and a wall member connected thereto to move to and from a closed position for completing the enclosure of said carriers, means for locking said member in closed position, a removable service plate extending over and enclosing the units in said other section and which has a part engaged by said movable wall member to hold said service plate in place when said member is locked.

7. In a vending machine, a casing having an intermediate section and a display section extending upwardly therefrom, a plurality of removable units arranged in said first section, a movable article carrier mounted on and extending upwardly from each unit into said display section for supporting the articles to be vended, said display section including a stationary upright member partly enclosing said carriers and having spaced side walls, and a member hinged thereto to move to and from closed position for completing the enclosure of said carriers and having spaced side walls overlapping the spaced side walls of said stationary member, and means for locking said members in overlapping relation.

8. In a vending machine, a casing having an intermediate section and a display section extending upwardly therefrom, a plurality of removable units arranged in said first section, a movable article carrier mounted on and extending upwardly from each unit into said display section for supporting the articles to be vended, said display section having an upright stationary wall member partly enclosing said carriers, a door completing the enclosure of said carriers, a removable service plate extending over said units in said other section, a front wall beneath which an edge of said plate extends, and a part on said plate against which said door engages to prevent removal of said plate when said door is closed, and means for locking said door in closed position.

GEORGE D. ILLIG.
FREDRICK W. ROBERTS.
KENNETH E. BERRAY.